United States Patent

Naber et al.

[11] Patent Number: 6,069,182
[45] Date of Patent: May 30, 2000

[54] RECYCLING OF PLASTIC WASTE CONTAINING A MIXTURE OF POLYURETHANES WITH OTHER PLASTICS

[75] Inventors: Bernhard Naber; Vera Neiss, both of Schwarzheide; Michael Gassan, Senftenberg; Werner Deutsch, Tuerkenfeld, all of Germany

[73] Assignee: BASF Aktiengesellschaft, Ludwigshafen, Germany

[21] Appl. No.: 08/610,196

[22] Filed: Feb. 28, 1996

[30] Foreign Application Priority Data

Mar. 23, 1995 [DE] Germany .......................... 195 10 638

[51] Int. Cl.[7] ...................................................... C08J 11/24
[52] U.S. Cl. .............................. 521/47; 521/49; 521/49.5; 528/76; 528/85; 528/494; 528/495
[58] Field of Search ............................... 521/49, 49.5, 47; 524/76, 85, 494, 495

[56] References Cited

U.S. PATENT DOCUMENTS

| | | | |
|---|---|---|---|
| 4,159,972 | 7/1979 | Braslaw et al. | 528/85 |
| 5,338,763 | 8/1994 | Munzamy et al. | 521/49.5 |
| 5,357,006 | 10/1994 | Gassan et al. | 525/453 |
| 5,508,312 | 4/1996 | Munzmay et al. | 521/49.5 |
| 5,556,889 | 9/1996 | Naber et al. | 521/49.5 |

FOREIGN PATENT DOCUMENTS 0 011 661 B1   6/1980   European Pat. Off. .

*Primary Examiner*—James J. Seidleck
*Assistant Examiner*—Olga Asinovsky
*Attorney, Agent, or Firm*—Fernando A. Borrego

[57] ABSTRACT

A process for recycling plastic waste containing a mixture of polyurethanes and other plastics, comprises reacting the plastic waste with an alcohol mixture comprising at least one low-molecular-weight, at least difunctional alcohol and at least one polyether-polyol, and then separating the resultant glycolysis polyol mechanically from the other plastic waste.

17 Claims, No Drawings

RECYCLING OF PLASTIC WASTE CONTAINING A MIXTURE OF POLYURETHANES WITH OTHER PLASTICS

The invention relates to a process for recycling plastic waste containing a mixture of polyurethanes with other plastics.

Polyurethanes are used in many areas of commerce. In order to achieve certain properties, they are frequently employed in combination with other materials. A special role is played here by thermoplastics, which can, if desired, by reinforced with glass fibers. Common thermoplastics are polyvinyl chloride, polyethylene terephthalate, polystyrene, copolymers of styrene, butadiene and acrylonitrile or polyolefins, for example polypropylene, which are frequently in the form of polymer mixtures, known as blends.

The recycling of waste comprising plastic mixtures of this type naturally causes much greater problems than the recycling of plastic waste comprising a single material. Such waste has therefore hitherto usually been disposed of to landfill or incinerated. However, these methods are becoming increasingly difficult owing to the limited amount of landfill space and the widespread objections to incineration. A number of processes for recycling plastic mixtures of this type has therefore already been presented in the past.

For example, EP-A-594 307 describes a process for separating plastic waste from automotive instrument panels comprising PVC and polyurethane foam, in which the waste is ground and then separated via cyclones into a stream comprising pure PVC and a stream comprising PVC contaminated with polyurethane foam. While the PVC fraction can be recycled, no use is given for the PVC/polyurethane foam fraction.

Kunststoffe 84 (1994) 3, pages 272 to 275, describes the recycling of automotive instrument panels comprising composite materials which, in addition to pure fractions comprising thermoplastics, which can be recycled, also gives a fraction comprising polyurethane foam and thermoplastics, for which no use can be indicated.

Since polyurethane foams are not thermoplastic, they are usually recycled chemically or thermally, if at all.

A common process for chemical recycling of polyurethane waste is glycolysis, in which the polyurethane waste is treated with at least one dihydric alcohol at elevated temperature, usually in the presence of catalysts.

The resultant polyolic liquids can be converted back into polyurethanes by reaction with isocyanates in the presence of known auxiliaries and additives.

The glycolysis process has been described many times, for example in DE-A-25 16 863, DE-A-25 57 172, DE-C-37 02 495, DE-A-42 34 335, U.S. Pat. No. 3,190,824 and U.S. Pat. No. 3,404,103, and in W. Raßhofer, "Recycling von PUR-Kunststoffen", Hüthig-Verlag, Heidelberg, 1994.

However, problems arise in the glycolysis of mixtures of polyurethanes and thermoplastics.

Since the thermoplastics melt under conventional glycolysis conditions, clumps, melt strands and baked-on deposits form in the reaction mixture. This can result in stirrer failure, problems with heat transfer or blockage of metering and discharge openings and process stoppages, possibly with damage. Treatment of such mixtures by the conventional glycolysis processes on an industrial scale is thus impossible.

It is an object of the present invention to provide a process in which a mixture of polyurethanes with thermoplastics can be glycolyzed without the disadvantages of the prior art and which gives a glycolysis polyol which can be re-employed for the preparation of polyurethanes.

We have found that, surprisingly, this object is achieved by a process in which the alcohol component for the glycolysis is a mixture of at least one low-molecular-weight, at least difunctional alcohol and at least one relatively high-molecular-weight polyether-polyol.

Use of an alcohol mixture of this type results, surprisingly, in the thermoplastics in the reaction mixture being in the form of small particles without any agglomeration or other aggregation of these particles. The particles can be removed from the final glycolyzate by conventional purification processes, for example by filtration. There is neither any impairment of the quality of the glycolyzate nor the above-described process problems.

The glycolysis polyol is preferably a mixture of at least one low-molecular-weight, difunctional alcohol having a molecular weight of up to 400 and at least one polyether-polyol which corresponds in structure to the polyether alcohol employed for the preparation of the polyurethane.

The low-molecular-weight, at least difunctional alcohol has, preferably, a molecular weight of from 62 to 400. Particularly advantageous are difunctional or trifunctional alcohols which are liquid at room temperature, such as glycerol, in particular difunctional alcohols, such as 1,4-butanediol, 1,5-pentanediol, 1,6-hexanediol, preferably ethylene glycol, diethylene glycol, propylene glycol, dipropylene glycol, particularly preferably diethylene glycol or dipropylene glycol.

The polyether-polyols can be conventional products used for the preparation of polyurethane plastics. These products are usually prepared by the base-catalyzed addition reaction of lower alkylene oxides, in particular ethylene oxide and/or propylene oxide, with H-functional initiator substances.

Polyether alcohols for flexible and semirigid polyurethane foams are usually prepared by the addition reaction of ethylene oxide and/or propylene oxide with dihydric and/or trihydric H-functional initiator substances, in particular glycerol and/or trimethylolpropane and/or glycols, such as ethylene glycol or propylene glycol, and usually have hydroxyl numbers in the range from 20 to 60 mg of KOH/g. Polyether alcohols for the production of rigid polyurethane foams are usually prepared by the addition reaction of ethylene oxide and/or propylene oxide with at least trifunctional initiator substances, for example sugar-alcohol or aromatic amines, such as TDA or anilin-formaldehyde condensation products, and usually have a hydroxyl number in the range from 200 to 800 mg of KOH/g.

Further details on these polyether alcohols are given, for example, in Kunststoffhandbuch, Volume 7, "Polyurethane", edited by Günter Oertel, 3rd Edition, Carl-Hanser-Verlag, Munich, 1993.

The preferred way in which the novel process is carried out does not require the polyether-polyol used to be a product which is totally identical with the polyether-polyol used for the preparation of the polyurethane to be glycolyzed.

Rather, it is sufficient for the polyether alcohol employed for the glycolysis to correspond in structure to that used for the preparation of the polyurethane, ie. for it to be a polyether-polyol as usually used for the preparation of a polyurethane of this type.

Thus, flexible or semirigid recycled polyurethane foams are glycolyzed in accordance with the invention using, in particular, flexible foam polyether-polyols, ie. those having a functionally of from 2 to 3 and a hydroxyl number of from 20 to 60 mg of KOH/g.

Accordingly, the glycolysis of rigid polyurethane foams is carried out in accordance with the invention using, in particular, rigid foam polyether-polyols, as described above.

The weight ratio between polyurethane-containing plastic mixture and low-molecular-weight, at least dihydric alcohol and polyether-polyol is preferably from 1 to 5:1 to 2:1 to 10 parts by weight.

In order to carry out the novel process, the plastic mixture is mixed with the alcohol component, warmed to the reaction temperature and kept at this temperature with stirring until the glycolysis is complete. The completion of the glycolysis is evident from the establishment of a constant viscosity of the reaction mixture. For the batch conditions customary in practice, the reaction time is usually from about 120 to 240 minutes. The mixture is then cooled, the particles of thermoplastics are separated from the glycolyzate mechanically, usually by filtration and the glycolyzate is worked up in a conventional manner.

In order to simplify dissolution of the used plastics in the alcohol component, they should be comminuted to a particle size of approx. 5 mm. Stirring of the reaction mixture during the reaction is essential.

The glycolysis temperature is preferably from 180 to 235° C., preferably from 190 to 220° C.

In order to keep the aromatic amine content in the glycolyzate low, it is advantageous, as described in DE-A-42 34 335, to meter glycidyl ether into the reaction mixture during the glycolysis. The metering of glycidyl ether is carried out continuously over the entire glycolysis reaction time.

In order to accelerate the reaction, catalysts can be employed. Suitable catalysts are, in particular, compounds of titanium and of divalent or tetravalent tin.

The thermoplastics in the recycling material together with the polyurethane foams do not, in the novel process, have an adverse effect either on the course of the process nor on the quality cf the end product. They are converted into a form in which they can easily be separated from the end product and do not undergo any interfering interactions with the other components of the reaction mixture or with one another.

This makes it possible, for the first time, for mixed fractions comprising polyurethane foam and thermoplastics, as produced, for example, in the recycling of waste from automotive dashboards, and which have hitherto been discarded, to be subjected to expedient material recycling. The glycolyzates obtained can be re-used as the polyol component for the preparation of polyurethanes.

The invention is illustrated in better detail with reference to the examples below:

EXAMPLE 1

(comparison)

3 kg of plastic web scrap from the production of automobile dashboards, which have been comminuted to a particle size of approx. 5 mm, comprising approx. 70% by weight of semirigid PUR foam, approx. 12% by weight of an acrylonitrile-butadiene-styrene/polyvinyl chloride blend and approx. 18% by weight of glass-fiber-reinforced polypropylene were transferred into a 25 l stirred reactor together with 10 kg of diethylene glycol, blanketed with nitrogen, heated to 200° C. and kept at this temperature for 3 hours with stirring. During this time, 1300 g of 2-ethylhexyl glycidyl ether were metered continuously into the reaction mixture. The reaction mixture was then cooled to room temperature.

A liquid glycolyzate was obtained, but clumps and edge deposits made emptying of the reactor impossible. The reactor batch had to be discarded.

EXAMPLE 2

The procedure was similar to that in Example 1, but the alcohol component was a mixture of 1 kg of diethylene glycol and 9 kg of a trifunctional polyether alcohol based on glycerol/propylene oxide having a hydroxyl number of 35 mg of KOH/g. Thermoplastics were in the form of approx. 5 mm particles in the glycolyzate and could be removed completely by filtration.

The glycolyzate had a hydroxyl number of 93 mg of KOH/g, an acid number of 0.25 mg of KOH/g and a viscosity of 1,520 mPa·s.

EXAMPLE 3

1 kg of a comminuted plastic mixture comprising approx. 82% by weight of rigid PUR foam and approx. 18% by weight of acrylonitrile-butadiene-styrene/polyvinyl chloride blend and glass-fiber-reinforced polypropylene and a mixture of 1 kg of diethylene glycol and 1 kg of a trifunctional polyether alcohol based on glycerol/propylene oxide having a hydroxyl number of 530 mg of KOH/g were reacted and worked up as described in Example 2.

The glycolyzate had a hydroxyl number of 580 mg of KOH/g, an acid number of 1.26 mg of KOH/g and a viscosity of 11,680 mPa·s.

EXAMPLE 4

2 kg of a comminuted plastic mixture comprising 88% by weight of flexible polyurethane foam and 12% by weight of polystyrene and a mixture of 1 kg of diethylene glycol and 1 kg of a polyether alcohol as in Example 2 were reacted and worked up as described in Example 2.

The resultant glycolyzate had a hydroxyl number of 233 mg of KOH/g, an acid number of 0.32 mg of KOH/g and a viscosity of 1,202 mPa·s.

EXAMPLE 5

3 kg of a comminuted plastic mixture comprising approx. 76% by weight of semirigid PUR foam and approx. 24% by weight of polypropylene and ethylene-propylene-diene-polymethylene polymer and a mixture of 1 kg of diethylene glycol and 8 kg of a polyether alcohol as in Example 2 were reacted and worked up as described in Example 2.

The resultant glycolyzate had a hydroxyl number of 125 mg of KOH/g, an acid number of 0.11 mg of KOH/g and a viscosity of 1,484 mPa·s.

The hydroxyl number was determined in accordance with DIN 53 240, the acid number was determined in accordance with DIN 53 402 and the viscosity was determined in accordance with DIN 53 015 at 25° C.

We claim:

1. A process for recycling plastic waste containing a mixture of polyurethane and thermoplastics, which comprises reacting the plastic waste with an alcohol mixture comprising at least one low-molecular-weight, at least difunctional alcohol and at least one polyether-polyol, and then separating the resultant glycolysis polyol mechanically from the other plastic waste, wherein the weight ratio of the plastic waste to the at least difunctional alcohol to the polyether-polyol is from 1 to 5:1 to 2:1 to 10.

2. A process as claimed in claim 1, wherein the low-molecular-weight, at least difunctional alcohol has a molecular weight of from 62 to 400 and a functionality of 2 or 3.

3. A process as claimed in claim 1, wherein the low-molecular-weight alcohol is a difunctional alcohol.

4. A process as claimed in claim 1, wherein the low-molecular-weight, at least difunctional alcohol is diethylene glycol or dipropylene glycol.

5. A process as claimed in claim 1, wherein the polyether alcohol corresponds in structure to the polyether alcohol used to prepare the polyurethane employed.

6. A process as claimed in claim 1, wherein flexible or semirigid polyurethane foams are glycolyzed using at least one difunctional and/or trifunctional polyether alcohol having a hydroxyl number of from 20 to 120 mg of KOH/g.

7. A process as claimed in claim 1, wherein rigid polyurethane foams are hydrolyzed using at least one trifunctional or polyfunctional polyether alcohol having a hydroxyl number of from 200 to 800 mg of KOH/g.

8. A process as claimed in claim 1, wherein at least one glycidyl ether is added to the reaction mixture during the glycolysis.

9. A process as claimed in claim 2, wherein the low-molecular-weight alcohol is a difunctional alcohol.

10. A process as claimed in claim 3, wherein the low-molecular-weight, at least difunctional alcohol is diethylene glycol or dipropylene glycol.

11. A process as claimed in claim 10, wherein the polyether alcohol corresponds in structure to the polyether alcohol used to prepare the polyurethane employed.

12. A process as claimed in claim 11, wherein flexible or semirigid polyurethane foams are glycolyzed using at least one difunctional and/or trifunctional polyether alcohol having a hydroxyl number of from 20 to 120 mg of KOH/g.

13. A process as claimed in claim 12, wherein rigid polyurethane foams are hydrolyzed using at least one trifunctional or polyfunctional polyether alcohol having a hydroxyl number of from 200 to 800 mg of KOH/g.

14. A process as claimed in claim 13, wherein at least one glycidyl ether is added to the reaction mixture during the glycolysis.

15. A process for recycling composite plastic waste comprising the steps of:

providing composite plastic waste containing a mixture of polyurethanes and thermoplastics, providing an alcohol mixture comprising a low molecular weight polyfunctional alcohol and a polyetherpolyol, reacting said plastic waste with said alcohol mixture to produce a glycolysis reaction product, and mechanically separating resultant glycolysis polyol from other plastic waste in said glycolysis reaction product, wherein the weight ratio of the plastic waste to the polyfunctional alcohol to the polyetherpolyol is from 1 to 5:1 to 2:1 to 10.

16. A process as claimed in claim 15, wherein said low molecular weight polyfunctional alcohol has a molecular weight of from 62 to 400 and a functionality of 2 or 3.

17. A process as claimed in claim 15, wherein the polyetherpolyol corresponds in structure to the polyetherpolyol used to prepare the polyurethane to be recycled.

* * * * *